UNITED STATES PATENT OFFICE.

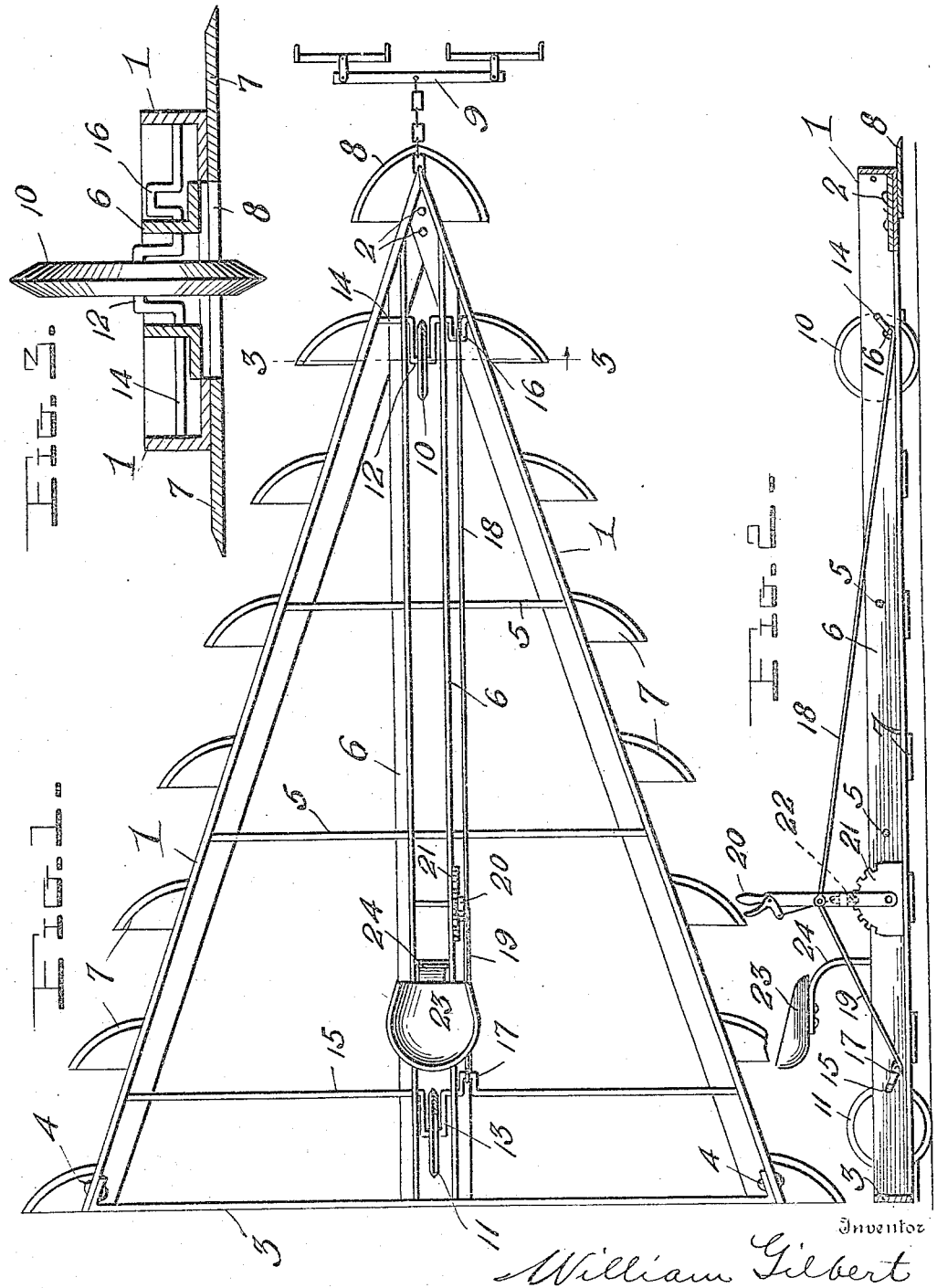

WILLIAM GILBERT, OF STERLING, COLORADO.

BRUSH-CUTTER.

951,812.  Specification of Letters Patent.  Patented Mar. 15, 1910.

Application filed May 6, 1909. Serial No. 494,222.

*To all whom it may concern:*

Be it known that I, WILLIAM GILBERT, a citizen of the United States, residing at Sterling, in the county of Logan and State of Colorado, have invented certain new and useful Improvements in Brush-Cutters, of which the following is a specification, reference being had to the accompanying drawings.

This invention relates to improvements in implements for cutting sage brush, weeds, and the like.

The object of the invention is to provide a simple and practical implement or machine of this character which may be drawn over the ground by one or more draft animals to effectively cut down sage brush, weeds and other vegetable growth and which has improved means for preventing it from shifting laterally when in operation.

With the above and other objects in view, the invention consists of the novel features of construction and the combination and arrangement of parts hereinafter fully described and claimed, and illustrated in the accompanying drawings, in which—

Figure 1 is a plan view of the improved brush cutter; Fig. 2 is a longitudinal section; and Fig. 3 is a detail transverse section taken on the plane indicated by the line 3—3 in Fig. 1.

My improved brush cutting implement or machine comprises a V-shaped body or frame having forwardly converging side bars 1 preferably made of angle metal and each having a horizontally disposed inwardly turned flange and an upwardly projecting vertical flange. The converging forward ends of the side bars 1 are riveted or otherwise secured together, as indicated at 2, and their diverging rear ends are united by a cross bar 3, the ends of which latter are fastened to the side bars, as shown at 4. The central portion of the frame is strengthened by the rods 5 and by other connections, if desired. The frame is further reinforced by a pair of spaced centrally disposed and longitudinally extending bars 6 also preferably of angle metal, as shown more clearly in Fig. 3.

Projecting laterally from the side bars 1 are cutting blades 7, any number of which may be provided. In practice, however, I preferably make the side bars 1 about eight feet in length and on each one mount six of the cutting blades 7 and provide an extra double cutting blade 8 at the center of the front end of the frame. Said blade 8 is of substantially semi-circular-shape while the other blades 7 are substantially triangular in shape. The forward edges of the blades 7, 8 are beveled and sharpened to provide cutting edges and said blades are of such width and so disposed that their cutting edges will overlap when the machine is viewed from the front end.

To permit the machine to be drawn by draft animals, a doubletree or other draft connection 9 may be connected by a chain or the like to the pointed front end of the frame.

For the purpose of preventing the machine from slipping or shifting sidewise when in operation, I provide front and rear colter wheels 10, 11. The latter have rims or edges of V-shape in cross section so that they will sink into the earth and prevent lateral movement of the frame when it strikes a heavy piece of brush or the like. Said wheels are disposed in longitudinal alinement between the spaced bars 6 of the frame and they are journaled on cranks 12, 13 of two transverse shafts 14, 15. Said shafts have their ends journaled in the vertical flanges of the side bars 1 and their intermediate portions journaled in the vertical flanges of the bars 6, as shown in Figs. 1 and 3. Also provided in the front and rear shafts 14, 15 are smaller cranks 16, 17 which are connected by links 18, 19 to a hand lever 20. The latter is pivoted at its lower end to a segmental locking rack 21 and carries a spring projected and hand retracted pawl 22 for engagement with said rack. It will be seen that when this pawl is retracted the hand lever may be swung either forwardly or rearwardly to raise or lower the cranks 12, 13 and hence to raise or lower the colter wheels 10, 11.

23 denotes a seat for the driver supported on a seat spring 24 having its lower end united to the bars 6.

In operation, as the machine is drawn over the ground by draft animals the cutting edges of the blades 7, 8 sever sage brush, stalks or other vegetable growth while the colter wheels 10, 11 prevent lateral shifting of the machine when it strikes heavy stalks or heavy pieces of brush or the like.

Having thus described the invention what is claimed is:

In a brush cutter, the combination of a V-shaped frame consisting of angle metal side bars arranged in rearwardly diverging relation and having their horizontal flanges inturned, cross bars uniting said side bars, and spaced parallel angle metal intermediate bars united to the cross bars and to the converging front ends of the side bars, a plurality of outwardly projecting cutting blades upon each of the side bars, front and rear transversely disposed rock shafts journaled in the upright flanges of the angle metal side and intermediate bars, each of said shafts having a crank portion disposed between the spaced intermediate bars, and a second crank portion disposed to one side of one of the intermediate bars, colter wheels rotatable upon the cranks between said intermediate bars, an upright hand lever pivotally mounted on one of the intermediate bars, links connecting said lever to the second mentioned cranks of the two rock shafts, and means for locking said lever in adjusted position.

In testimony whereof I hereunto affix my signature in the presence of two witnesses.

WILLIAM GILBERT.

Witnesses:
F. G. AYRES,
W. L. PARTRIDGE.